United States Patent [19]

Shiiki et al.

[11] Patent Number: 4,495,332
[45] Date of Patent: Jan. 22, 1985

[54] PROCESS FOR PRODUCING AROMATIC SULFIDE POLYMERS

[75] Inventors: Zenya Shiiki; Yo Iizuka; Yukichika Kawakami, all of Iwaki, Japan

[73] Assignee: Kureha Kagaku Kogyo Kabushiki Kaisha, Tokyo, Japan

[21] Appl. No.: 517,837

[22] Filed: Jul. 27, 1983

[30] Foreign Application Priority Data

Jul. 29, 1982 [JP] Japan ................................ 57-131166
Apr. 11, 1983 [JP] Japan ................................ 58-63256

[51] Int. Cl.$^3$ ............................................. C08F 2/16
[52] U.S. Cl. .................................... 524/800; 524/714; 524/726; 524/837; 528/25; 528/388
[58] Field of Search ................ 528/388, 25; 524/800, 524/837, 726, 714

[56] References Cited

U.S. PATENT DOCUMENTS

| | | | |
|---|---|---|---|
| 4,038,259 | 7/1977 | Campbell et al. | 528/388 |
| 4,038,260 | 7/1977 | Campbell et al. | 528/288 |
| 4,038,261 | 7/1977 | Crouch et al. | 528/388 |
| 4,038,262 | 7/1977 | Edmonds, Jr. | 528/388 |
| 4,039,518 | 8/1977 | Campbell | 528/388 |

*Primary Examiner*—Melvyn I. Marquis
*Attorney, Agent, or Firm*—Wenderoth, Lind & Ponack

[57] ABSTRACT

A process for obtaining aromatic sulfide polymer which has a markedly high molecular weight and can be readily formed into films, fibers, and other structures. The process comprises heating, in an aprotic solvent to a temperature of 100° to 250° C., (i) a dihaloaromatic compound and (ii) substantially anhydrous fine powder of the sulfide of an alkali or alkaline earth metal in the presence of (iii) substantially anhydrous fine powder of the carbonate of an alkali or alkaline earth metal, or of a mixture thereof with a hygroscopic inorganic salt and (iv) a strictly controlled very small amount of water dissolved in or solvated with the solvent.

11 Claims, No Drawings

PROCESS FOR PRODUCING AROMATIC SULFIDE POLYMERS

BACKGROUND OF THE INVENTION

1. Field of the Art

This invention relates to a process for producing an aromatic sulfide polymer by subjecting a dihaloaromatic compound to dehalogenation/sulfidation reactions with a metal sulfide. More particularly, this invention relates to a process for producing an aromatic sulfide polymer having a markedly high molecular weight, characterized in that the polmerization reaction is conducted under specific conditions.

In recent years thermoplastic resins having everincreasing thermal resistance have been in demand for electronics parts, automobile parts, etc. Aromatic sulfide polymers may have such properties as to meet such a demand, but the conventional polymers of this class have been of high crystallinity, and, moreover, it has been difficult to obtain such polymers of amply high molecular weight. For this reason, there have been serious problems such as the difficulty of molding these polymers into films, sheets, fibers, etc. and the fragility of the resulting molded products. The present invention provides a novel process for producing a linear aromatic sulfide polymer having markedly high molecular weight to solve these problems.

2. Prior Art

Hitherto the following processes for producing aromatic sulfide polymers have been known.

(1) A process for melting and reacting elemental sulfur, dichlorobenzene and a base such as $Na_2CO_3$ in the absence of a solvent (U.S. Pat. Nos. 2,513,188, 2,538,941, etc.).

(2) A process in which an alkali metal sulfide, especially $Na_2S.9H_2O$, is heated in a polar solvent to remove its water of crystallization, and a mixture of the resulting anhydrous sulfide and dichlorobenzene is subjected to thermal polymerization (U.S. Pat. No. 3,354,129, etc.).

(3) A process similar to the above described process (2) in which $Na_2S.9H_2O$ is heated in a polar solvent containing a carboxylate salt caused to coexist therewith to remove its water of crystallization, and a mixture of the resulting anhydrous sulfide and dichlorobenzene is subjected to thermal polymerization (U.S. Pat. Nos. 3,919,177, 4,089,847, etc.).

As far as we are aware, these processes do not appear to be satisfactory. More specifically, the molecular weight of the resulting polymer according to the above described process (1) is too low, and it is difficult to obtain a linear aromatic sulfide polymer for practical uses. According to the above process (2), a polymer having molecular weight somewhat higher than that according to the above process (1) is obtained, but it is still difficult to obtain a linear aromatic sulfide polymer having satisfactory molecular weight for practical uses. The above process (3) has been developed to increase the molecular weight of the polymer prepared according to the process (2), whereby the molecular weight itself has been considerably improved. The process (3), however, is still unsatisfactory for readily producing films, sheets, fibers, etc. having great toughness.

The difficulty of amply raising the molecular weight in the above process (2) or (3) may be attributed to the following and other reasons. Since, in spite of the fact that the minute quantity of the coexisting water has a very great influence on the increase or decrease of the molecular weight, a process wherein the large quantity of water entering into the solvent from the starting material $Na_2S.9H_2O$ is evaporated off by heating in the solvent is adopted:

(a) complete dehydration is difficult, and control of the quantity of the dehydration is also difficult;

(b) with the process in a state wherein a considerable quantity of water content still remains, the heavy metal of the reaction vessel is corroded and undergoes elution, and the heavy metal ions inhibit the formation of a polymer of high molecular weight; and (c) during the evaporating off of the water content, the sulfur content is also caused, in the form of $H_2S$ and the like, to accompany the water and is lost, whereby precise control of the sulfur content becomes difficult.

Moreover, a problem encountered in the process (3) is that, since a large number of water-soluble salts of organic acids, especially acetate, are caused to exist in the polymerization system, a large amount of organic acids is admixed with waste water used for treating the polymerization product, which may cause pollution problems. Furthermore, a great expenditure would be needed to remove the contaminated organic acid.

SUMMARY OF THE INVENTION

An object of the present invention is to overcome the above described difficulties of the conventional processes and to provide a process for producing a linear aromatic sulfide polymer which has markedly high molecular weight, is readily susceptible to oxidation treatment and can be suitably molded into films, sheets, fibers, etc. having great toughness. The present process achieves this object without substantially causing any pollution problems.

As a result of research we have conducted in order to obtain a linear aromatic sulfide polymer with high molecular weight, we have found that $CO_3^{2-}$ ions which take part in a polymerization reaction under alkaline conditions serve to increase the molecular weight of the resulting polymer and that this polymerization reaction requires the presence of a controlled amount of water. Accordingly, we have tried to cause a carbonate of an alkali metal or alkaline earth metal to participate in the polymerization reaction. However, it was difficult to involve the carbonate effectively in the polymerization reaction since the carbonate is substantially insoluble in ordinary solvents for the polymerization reaction.

We have succeeded in solving the problem by heating in an aprotic solvent a dihaloaromatic compound and substantially anhydrous fine powder of the sulfide of an alkali or alkaline earth metal in the presence of substantially anhydrous fine powder of the carbonate of an alkali or alkaline earth metal or of a mixture thereof with a hygroscopic inorganic salt, and also a strictly controlled very small amount of water which may be solvated with the solvent.

The metal carbonate is substantially insoluble in the solvent but can be caused to take part in the polymerization reaction effectively when used in the form of fine powder. Thus, the carbonate serves to increase the molecular weight of the resulting polymer. The metal carbonate acts partly as a basic pH modifier and the like in the last stage of the polymerization reaction. Furthermore, the anhydrous carbonate serves partly as a dehydration agent to adsorb and desorb solvated water and acts as a solvated water modifier in the polymerization reaction. Thus, it has been found that the carbonate is effective for controlling hydrolysis of the solvent and the resulting polymer or the like, whereby a high molecular weight polymer is obtained. We have tried to reduce the amount of the metal carbonate to be added by replacing some of the carbonate with a hygroscopic inorganic salt to form a mixture thereof. As a result, it has been found that the same effect as that with the metal carbonate alone or a better (synergistic) effect can be obtained. Reduction of the amount of the metal carbonate used is advantageous in that the quantity of an acid for neutralizing the polymerization system at the end of the polymerization can be largely reduced.

The reason for the synergistic effect obtained in the case of a mixture of the metal carbonate and a hygroscopic inorganic salt will now be considered. For example, $CaCO_3$ as the carbonate and $CaCl_2$ as the hygroscopic salt are combined in a ratio of 1 g equivalent/1 g equivalent. Calcium acts as a very strong base in the case of $CaCO_3$ alone. In the case of such a combined salt, calcium is affected by the coexisting $Cl^-$ atmosphere and is ionically bonded with $(CO_3)^{2-}$ ions as $(CaCl)^+$ ions (cf. formulas given below). As a result, the alkalinity is weakened and side reactions are controlled. It is thus considered that the molecular weight of the polymer is increased.

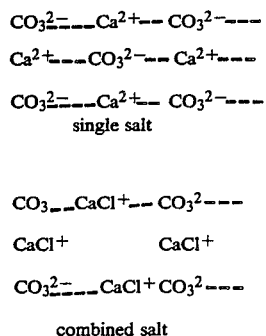

single salt combined salt

Such a control effect due to the ionic strength of the metal will be markedly exhibited particularly when the combined salt mixture is chemically prepared, although the effect is also exhibited in the case of an intimate salt mixture which has been physically prepared.

The present invention has been developed on the basis of these findings.

According to this invention briefly summarized, there is provided a process for preparing an aromatic sulfide polymer which comprises heating, to a temperature of 100° to 250° C. in an aprotic solvent, (A) a dihaloaromatic compound and (B) substantially anhydrous fine powder of the sulfide of a metal selected from the group consisting of an alkali metal and an alkaline earth metal in the presence of (C) substantially anhydrous fine powder of the carbonate of a metal selected from the group consisting of an alkali metal and an alkaline earth metal, or of a mixture of the metal carbonate and a hygroscopic inorganic salt and (D) water dissolved in the solvent used in a quatity of 0.01 to 2 mols per gram equivalent of the metal sulfide used.

As for the terms "a dihaloaromatic compound", "a sulfide", "a carbonate", "a hygroscopic inorganic salt" and "an aprotic solvent" used herein, it should be understood that these terms refer to their respective compounds or substances and also encompass their mixtures within the ranges defined herein. For example, the present invention encompasses as an embodiment the case where "a dihaloaromatic compound" consists of the compounds of plural species and especially two species, and the resulting aromatic sulfide polymer is an aromatic sulfide copolymer.

DETAILED DESCRIPTION OF THE INVENTION

Dihaloaromatic Compounds

The dihaloaromatic compounds to be used in the present invention, which correspond to the monomers to form the skeletons of the resulting aromatic sulfide polymers, can be any aromatic compounds as long as they have aromatic nuclei and two halogen substituents on the nuclei thereof and as long as they can be polymerized via dehalogenation/sulfidation reactions with alkali or alkaline earth metal sulfides. Thus, the aromatic nuclei can consist of aromatic hydrocarbons and can be substituted aromatic compounds having substituents which do not impede the dehalogenation/sulfidation reactions.

More specifically, the dihaloaromatic compounds to be used in the present invention include, for example, the compounds represented by the following formulas.

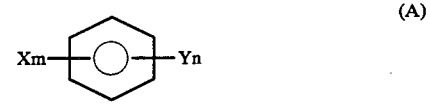
(A)

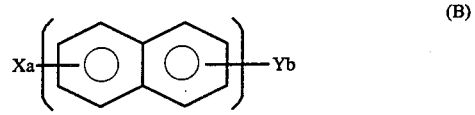
(B)

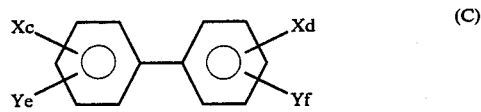
(C)

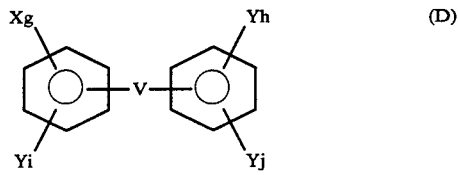
(D)

The substituents in the above described formulas are defined as follows:

X is a halogen selected from the group consisting of Cl, Br, I and F, preferably Cl or Br;

Y is a substituent selected from the group consisting of —R, —OR and —COOH, R being selected from the group consisting of an alkyl, a cycloalkyl, an aryl and an aralkyl, wherein the alkyl or alkyl moiety normally has 1 to about 18 carbon atoms and the aryl or aryl moiety normally has 6 to about 18 carbon atoms; and V is a substituent selected from the group consisting of —O—, $-S-$, $-SO-$, $-SO_2-$ and

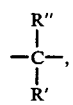

R' and R" being selected from the group consisting of an alkyl, a cycloalkyl, an aryl and an aralkyl, wherein the alkyl or alkyl moiety and the aryl or aryl moiety are as defined above. In the formula (A), m=2 and n is an integer defined by $0 \leq n \leq 4$; in the formula (B), a=2 and b is an integer defined by $0 \leq b \leq 6$; in the formula (C), the c, d, e and f are integers defined by $0 \leq c \leq 2$, $0 \leq d \leq 2$, $c+d=2$, $0 \leq e$, and $f \leq 4$, respectively; and the g, h, i and j in the formula (D) are integers defined by $0 \leq g \leq 2$, $0 \leq h \leq 2$, $g+h=2$, $0 \leq i$, and $j \leq 4$, respectively.

The dihaloaromatic substituted compounds represented by the general formulas include, for example, p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, p,p'-dichlorodiphenyl ether, 3,3'-dichlorodiphenyl sulfone, 3,3'-dichlorodiphenyl sulfoxide, and 3,3'-dichlorodiphenyl sulfide. Among these, especially preferred are p-dichlorobenzene, m-dichlorobenzene and 3,3'-dichlorodiphenyl sulfone.

The present sulfide polymer is a polymer of the above described dihaloaromatic compound(s). Thus, it is possible to concomitantly use a monohalo compound (not always an aromatic compound) for forming the end groups of the resulting polymer, or for controlling the polymerization reaction or molecular weight, and also to concomitantly use a multihalo compound having three or more halogen atoms (not always an aromatic compound) for forming a branched or crosslinked polymer. In the case where the above mentioned monohalo or polyhalo compound is a haloaromatic compound, the above specific examples of the resulting polymers will be easily recognized by those skilled in the art as monohalo- or polyhalo- derivatives of the above mentioned sulfide polymers.

Metal Sulfides

The metal sulfide functions as a sulfur source and a dehalogenation agent in the polymerization reaction of the present invention. A sulfide of a metal selected from alkali metals and alkaline earth metals is used as the metal sulfide, and preferably the sulfides of an alkali metal such as Na and K or of an alkaline earth metal such as Ca, Mg, Ba and Sr are used. From the viewpoint of easy handling, sodium sulfide is especially preferred.

Such metal sulfides should be in the form of powder, which should be as fine as possible. More specifically, it is desirable that the fine powder comprise predominantly particles passing through a screen having openings of 2 mm, preferably 0.2 mm. Such fine powder can be prepared by pulverizing the sulfide by means of an ordinary grinder such as a ball mill, colloid mill, coffee mill, mortar, stone mill-type grinder, or jetomizer.

The sulfide to be used in the present invention should be substantially anhydrous. The term "substantially anhydrous" used herein means that the sulfide is dried to such an extent that the residual amount of water therein per gram equivalent of the sulfide never exceeds 1.0 mol. Drying can be conducted before or after the above mentioned grinding step. However, it should be done on a dry basis, that is, in the absence of a solvent or a liquid dispersion agent. More specifically, it is preferable that the sulfide be heated under atmospheric or reduced pressure.

It is desirable that the dihaloaromatic compound monomer be used in a proportion of 0.8 to 1.1 gram equivalent, preferably 0.8 to 1.0 gram equivalent relative to 1 gram equivalent of the metal sulfide. A proportion less than or more than this range is undesirable since it will result in a polymer of low molecular weight.

Metal Carbonate and Hygroscopic Inorganic Salt

The metal carbonate, which is useful for increasing the molecular weight of the resulting polymer in the present liquid phase reaction, is a carbonate salt of a metal selected from the group consisting of alkali metals and alkaline earth metals. The carbonate of an alkali metal such as Na or K, or of an alkaline earth metal such as Ca, Mg or Ba is preferred. Especially preferred is sodium carbonate from the viewpoint of the effect on increasing the molecular weight.

The hygroscopic inorganic salt can be used as a solvated water modifier and a metal-ionic strength modifier in the present process. A hygroscopic, nonoxidative, neutral or very weakly basic or very weakly acidic inorganic salt of an alkali metal or an alkaline earth metal is effective for such hygroscopic inorganic salts. For example, an alkali or alkaline earth metal salt of $SO_4{}^{2-}$, $SO_3{}^{2-}$, $Br^-$, $Cl^-$, $I^-$, $HPO_4{}^{2-}$, $P_2O_7{}^{4-}$, $P_3O_{10}{}^{3-}$, $PO_3{}^-$, $PO_4{}^{3-}$, $BO_2{}^-$ or $B_4O_7{}^{2-}$ is preferred. Among these, a metal salt of $SO_4{}^{2-}$, $Br^-$, $Cl^-$, $HPO_4{}^{2-}$, $PO_4{}^{3-}$, $P_2O_7{}^{4-}$, $P_3O_{10}{}^{5-}$ or $BO_2{}^-$ is more preferred, the first three being the most preferable for their effectiveness and economy.

The term "hygroscopic" in the case of hygroscopic inorganic salts herein means that the salts can have water of crystallization.

These metal compounds and salts should be in the form of substantially anhydrous fine powder. The meaning of "anhydrous" and that of "fine powder" are the same as those defined with respect to the metal sulfides.

When the metal carbonate and the hygroscopic inorganic salt are used in combination, the effects as described above can be expected. For combining these two compounds, a chemical mixing method or a physical mixing method can be used. The former method comprises preparing a uniform solution of the metal carbonate and the hygroscopic inorganic salt, and removing water. According to the method, a vitreous compound wherein the metal cations, $CO_3{}^{2-}$ ions and anions ($SO_4{}^{2-}$, $Br^-$, etc.) of the hygroscopic inorganic salt component are ion-bonded at random is formed. The latter method comprises mixing fine powder of the metal carbonate and fine powder of the hygroscopic inorganic salt uniformly by means of a mixer or the like. The chemical mixing method is more effective for producing the above described effects.

The quantitative ratio of the metal carbonate to the hygroscopic inorganic salt is preferably in the range represented by metal carbonate (g.equiv.):hygroscopic inorganic salt (g.equiv.)=1:(0 to 50).

The ratio of 1:0 means the case wherein no hygroscopic inorganic salt is added. The quantity of the latter salt of more than 50 g.equiv. per g.equiv. of the metal carbonate is not desirable because the amount of the metal carbonate used is too small, and the action of controlling the pH becomes insufficient.

The quantitative ratio of the metal sulfide to be used in the reaction to the amounts of the metal carbonate and the hygroscopic inorganic salt to be added to the polymerization system in the present process is preferably in the range represented by metal sulfide (g.equiv.):(metal carbonate (g.equiv.) or metal carbonate (g.equiv.)+hygroscopic inorganic salt (g.equiv.))=1:(0.3 to 10).

A ratio in the range of 1:(0.5 to 4) is especially preferred. When the quantity of the latter salt (carbonate or carbonate+hygroscopic salt) is less than 0.3 per g. equiv. of the metal sulfide, the effect on increasing the molecular weight is insufficient. On the other hand, the viscosity of the reaction system becomes too high and stirring is difficult when the quantity is over 10.

Solvent and Water

The solvent to be used in the present polymerization reaction is an organic solvent having no active hydrogen, that is, an aprotic solvent. A solvent having active hydrogen is undesirable because the solvent itself may impede the polymerization reaction or the product formed by a reaction involving the active hydrogen may secondarily cause a harmful reaction.

The aprotic solvent should be stable at the temperature and alkaline condition which are encountered in the polymerization reaction of the present invention, and moreover it should not impede the present polymerization reaction unduly.

The solvent should have at least such solvency power as to dissolve the dihaloaromatic compound material and the metal sulfide to produce $S^{2-}$ ions to a concentration necessary for the reaction.

It is desirable that the solvent not participate in the dehalogenation/sulfidation reactions in such a way that the dihaloaromatic compound material takes part in the reaction. For example, it is thus desirable that the solvent not be a dihaloaromatic hydrocarbon. If desired, however, it is possible to cause an excess amount of the dihaloaromatic compound material to act as a solvent. Accordingly, the term "in an aprotic solvent" used herein is intended to encompass the case where the dihaloaromatic compound material itself is used as a solvent, although it may appear that no solvent is present.

The solvent used in the present invention is also for providing a very small controlled amount of water for the polymerization reaction. Thus, it is desirable that the water as the solute can be solvated in the solvent. In the present invention, however, it is of no practical value to confirm whether the aprotic solvent and water are actually solvated or not. Thus it can be said that the amount of water to be added to the present polymerization reaction corresponds to the amount of water which has been solvated with the aprotic solvent, as detailed below.

Specific examples of such aprotic solvents are:

(1) amides such as hexamethylphosphoric triamide (HMPA), N-methylpyrrolidone (NMP), tetramethyl urea (TMU), dimethylformamide (DMF) and dimethyl acetamide (DMA);

(2) etherified polyethylene glycols such as polyethyleneglycol dialkyl ether (degree of polymerization being about 2,000, the alkyl group having 1 to about 20 carbon atoms); and (3) sulfoxides such as tetramethylene sulfoxide and dimethyl sulfoxide (DMSO). Among these solvents, especially preferred are HMPA and NMP in view of their high chemical stability.

The amount of the aprotic solvent to be used is preferably in the range of 0.1 to 10 liters per mol of the sulfide used in the polymerization, i.e. 0.05 to 5 liters of aprotic solvent is used per gram equivalent of the sulfide. An amount of the solvent less than this range is undesirable because the viscosity of the reaction system becomes too high and uniform polymerization reaction is impeded. On the other hand, an amount of the solvent greater than the range is undesirable from the economical point of view because the amount of the solvent used becomes too large for the amount of polymer to be obtained.

Water is caused to exist in the polymerization reaction system in such a state that water is added and dissolved in the aprotic solvent according to the invention. In general, the water content to be present in the polymerization reaction is made as small as possible in order to avoid side reactions such as hydrolysis reaction. On the other hand, when the polymerization reaction is conducted in a totally anhydrous state, the reaction may sometimes incur side reactions such as decomposition of the solvent caused by a substantially anhydrous carbonate or mixtures thereof with a hygroscopic inorganic salt or a substantially anhydrous sulfide. Thus, it is desirable that the amount of water to be added as the solvating water in the present polymerization reaction be in the range of 0.01 to 2 mols, preferably 0.01 to 1 mol, per gram equivalent of the metal sulfide.

Polymerization

The polymerization according to the present invention is caused to proceed by heating a reaction mixture comprising the above described components to a temperature in the range of 100° to 250° C. A temperature lower than 100° C. is undesirable from the economical point of view because of very low reaction rate. On the other hand, a temperature higher than 250° C. is also undesirable because the carbonate may act, not as a catalyst, but as a dehalogenation agent and cause an abnormal reaction whereby the decomposition of the resulting polymer or the solvent may become too active. Especially, a temperature in the range of 180° to 230° C. is preferred because a high-molecular polymer can be rapidly obtained. The polymerization reaction can be conducted at a constant temperature or can also be conducted by elevating the reaction temperature stepwise or continuously.

In the present polymerization process, it is preferable that a specific amount of a dihaloaromatic compound and a specific small amount of water be dissolved in the solvent, that a fine powder consisting of specific amounts of a substantially anhydrous metal sulfide and a metal carbonate or a substantially anhydrous mixture thereof with a hygroscopic inorganic salt be added thereto and dispersed uniformly, and that the resulting system be then subjected to thermal polymerization. It is also possible to add a portion or all of the fine powder consisting of the carbonate or a substantially anhydrous mixture thereof with a hygroscopic inorganic salt in the course of the polymerization reaction. A variety of ordinary polymerization methods such as a batch system, a step-by-step system, and a continuous system can be employed.

It is desirable that the polymerization atmosphere be a non-oxidative atmosphere. For example, the empty interior of the polymerization system is preferably replaced with an inert gas such as nitrogen or argon before starting the polymerization reaction.

The resulting polymer can be separated out by the steps of heating the reaction mixture after termination of the reaction under reduced or atmospheric pressure to distill only the solvent away, then washing or extracting the residual solid product once or twice or more with a solvent such as water, a ketone, an alcohol, an aromatic hydrocarbon, a halohydrocarbon, or an ether, carrying out neutralization, washing with water, filtering and drying. Another method for obtaining the polymer comprises adding to the reaction product after termination of the reaction a solvent such as water, an ether, a halohydrocarbon, an aromatic hydrocarbon or an aliphatic hydrocarbon as a precipitation agent, thereby precipitating the solid product such as the polymer and inorganic salts, and then carrying out filtration, washing or extracting and drying.

The polymerization methods described above do not use an organic salt as a molecular-weight-increasing agent. Thus, there exists no pollution problem due to disposal of an organic acid dissolved in washing water.

In accordance with suitable selection and combination of the dihaloaromatic compounds, a branched polymer or a copolymer having two or more different reaction units can be obtained as described above. For example, by the combination of dichlorobenzene used as the dihaloaromatic compound material and a small amount of, e.g. up to 10 mol % of the dihaloaromatic compound, of trichlorobenzene, a phenylene sulfide polymer having branched chains can be obtained. By the combination of p-chorobenzene and m-dichlorobenzene or p,p'-dichlorodiphenyl sulfone, a copolymer containing

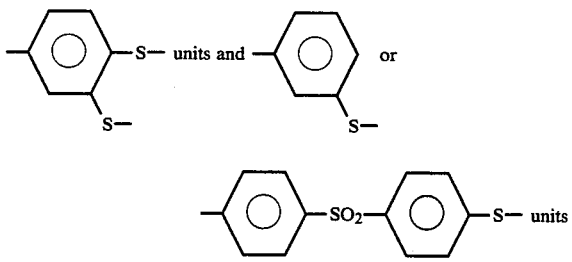

can be obtained.

Polymer Formed

The polymer powder obtained according to the present process is a linear polymer which has a markedly high molecular weight and is readily susceptible to oxidation treatment in comparison with the conventional aromatic sulfide polymer powder. Thus, the polymer powder according to the present invention, as it is or with some oxidation treatment as necessary, shows excellent spinnability even at a high melt viscosity, and can be formed into films, sheets, fibers, etc. having toughness and thermal resistance. The present polymer powder can also be processed into molded articles by injection molding, extrusion, rotational molding, etc. The molded articles are substantially free from cracks even when they are thick.

Moreover, the polymer according to the present invention can be used by incorporating therein a powder filler such as carbon black, calcium carbonate powder, silica powder, or titanium oxide powder or a fiber filler such as carbon fiber, glass fiber, asbestos, or polyaramide fiber.

The present invention can also be used by blending therewith one or more synthetic resins such as polycarbonate, polyphenylene oxide, polysulfone, polyarylene, polyacetal, polyimide, polyamide, polyester, polystyrene, and ABS.

The following examples illustrate the invention, but do not limit the scope thereof.

EXAMPLES 1 THROUGH 15

Preparation of a substantially anhydrous metal sulfide $Na_2S.5H_2O$ (manufactured by Nagao Soda K.K., Japan) was dried under reduced pressure in a vacuum drier under the condition of 220° C./3 torr for about one day to obtain substantially anhydrous $Na_2S$ (water content: not more than 0.05 mol per gram equivalent of $S^{2-}$).

The resulting anhydride was pulverized to a particle size of not more than 1 mm for subsequent use.

Preparation of substantially anhydrous metal carbonates

Commercially available anhydrous $Na_2CO_3$, $K_2CO_3$, $CaCO_3$, $MgCO_3$ and $BaCO_3$ were respectively pulverized to a particle size of 0.3 mm or less by means of an atomizer. Then, the resulting powder was dried under reduced pressure in a vacuum drier under the condition of 225° C./3 torr for one day to obtain a substantially anhydrous powder (water content: 0.05 mole or less per gram equivalent of $CO_3^{2-}$).

Preparation of the physical mixture of a metal carbonate and a hygroscopic inorganic salt Each of $Na_2SO_4$, $Na_2HPO_4$, $Na_3P_3O_{10}$, $Na_4P_2O_7$, $Na_3PO_4$ and $NaBO_2$ used as the hygroscopic inorganic salt was dried under reduced pressure in a vacuum drier under the condition of 225° C./3 torr for 8 hours. Then, each dried salt was pulverized with an atomizer and sifted through a 48-mesh (Tyler) screen thereby to obtain fine particles of 0.3 mm or smaller particle size, and the resulting powder was dried under reduced pressure for 15 hours under the same condition as above to obtain a substantially anhydrous powder (water content: 0.05 mole or less per gram equivalent of each cation).

Specific amounts of the above mentioned hygroscopic inorganic salt powder and the above mentioned metal carbonate powder were mixed in a V-type mixer for subsequent use.

Preparation of the chemical mixture of a metal carbonate with a hygroscopic inorganic salt Specific amounts of the metal carbonate and one of the hygroscopic inorganic salts, $Na_2SO_4$, $CaCl_2$, $MgBr_2$ and $Li_2SO_4$, were mixed. About a 10-fold amount of water was added to each mixture. The resulting mixture was heated in an oil-bath rotary evaporator (bath temperature: about 150° C.) to dissolve uniformly the salts contained therein. The water was evaporated off under reduced pressure to produce a hydrous substance containing water of the same weight as the salt mixture. The hydrous substance was then dried under reduced pressure for 8 hours in a vacuum drier under the condition of 225° C./5 torr to obtain a chemically ion-bonded mixture. The mixture was pulverized with an atomizer and sifted with a 150-mesh (Tyler) screen thereby to obtain powder of 0.1 mm or less in particle size, which was again dried for 15 hours in a vacuum drier under the same condition to produce a substantially anhydrous chemical mixture (water content: 0.05 mole or less per gram equivalent of cations).

Polymerization

A 20-liter autoclave made of stainless steel and equipped with a vane stirrer was charged with a specific amount of a solvent. Precisely weighed amounts of water and a haloaromatic compound were further added to the solvent to prepare a solution. Then, to the resulting solution was added a specific amount of the physical mixture or chemical mixture consisting of a substantially anhydrous powder of a metal carbonate and a hygroscopic inorganic salt which mixture had been prepared in the above described steps, which step was followed by addition of a specific amount of a substantially anhydrous powder of a metal sulfide. The autoclave was sealed; the atmosphere therein was replaced with nitrogen; and then the temperature therein was raised to the polymerization temperature. The reaction mixture was heated at that temperature for a specific period of time to effect polymerization.

After termination of the polymerization, the content in the autoclave was cooled and taken out. About 5 moles of $NH_4Cl$ was added thereto, and the mixture was heated in a rotary evaporator at a temperature of 100° C. or lower under reduced pressure to remove the solvent. Then the solid residue was taken out, washed three times with hot water, dried at about 80° C. for half a day, further washed twice with ethylene dichloride and dried again at about 80° C. to obtain a polymer.

Evaluation of physical properties

The melt viscosity of each of the resulting polymers was measured by means of a Koka flow tester (300° C., under a load of 100 Kg). The results are set forth in Table 1.

TABLE 1

| Example No. | Metal carbonate or metal carbonate-hygroscopic inorganic salt mixture | | | | | Haloaromatic compound | |
|---|---|---|---|---|---|---|---|
| | metal carbonate | hygroscopic inorganic salt | mixing ratio (g eq./g eq.) | mixing method | charged[6] amount (g. equiv.) | type | charged amount (g. equiv.) |
| 1 | $Na_2CO_3$ | — | — | alone | 30 | p-DCB[1] | 28.0 |
| 2 | $CaCO_3$ | — | — | alone | 40 | p-DCB | 28.0 |
| 3 | $MgCO_3$ | — | — | alone | 40 | p-DCB | 28.0 |
| 4 | $BaCO_3$ | — | — | alone | 40 | p-DCB | 28.0 |
| 5 | $Na_2CO_3$ | $Na_2SO_4$ | 1/19 | ph[7] | 30 | p-DCB | 27.9 |
| 6 | $Na_2CO_3$ | $Na_2SO_4$ | 1/19 | ch[7] | 30 | p-DCB | 28.1 |
| 7 | $K_2CO_3$ | $Na_2SO_4$ | 1/19 | ch | 30 | p-DCB | 28.0 |
| 8 | $Na_2CO_3$ | $CaCl_2$ | 1/0.5 | ch | 20 | p-DCB | 18.4 |
| | | | | | | TCB[2] | 0.1 |
| 9 | $Na_2CO_3$ | $MgBr_2$ | 1/0.5 | ch | 20 | p-DCB | 18.5 |
| 10 | $Na_2CO_3$ | $Li_2SO_4$ | 1/0.5 | ch | 25 | p-DCB | 27.9 |
| 11 | $Na_2CO_3$ | $Na_2HPO_4$ | 1/0.5 | ph | 25 | p-DCB | 27.8 |
| 12 | $Na_2CO_3$ | $Na_5P_3O_{10}$ | 1/0.5 | ph | 25 | p-DCB | 20.1 |
| 13 | $CaCO_3$ | $Na_4P_2O_7$ | 1/19 | ph | 25 | p-DCB | 28.1 |
| 14 | $MgCO_3$ | $Na_3PO_4$ | 1/19 | ph | 25 | p-DCB | 28.0 |
| 15 | $Na_2CO_3$ | $NaBO_2$ | 1/19 | ph | 21 | p-DCB | 17.0 |
| | | | | | | m-DCB[3] | 1.5 |

| Example No. | Metal sulfides | | water added (mol.) | Solvents | | Polymerization condition | | Melt viscosity of the resulting polymer (poise) |
|---|---|---|---|---|---|---|---|---|
| | type | charged amount (g. equiv.) | | type | charged amount (liter) | temperature (°C.) | time (hrs) | |
| 1 | $Na_2S$ | 30.0 | 7.0 | NMP[4] | 15 | 210 | 18 | 520 |
| 2 | $Na_2S$ | 30.0 | 7.0 | NMP | 15 | 205 | 40 | 710 |
| 3 | $Na_2S$ | 30.0 | 7.0 | NMP | 15 | 205 | 40 | 540 |
| 4 | $Na_2S$ | 30.0 | 7.0 | NMP | 15 | 205 | 40 | 720 |
| 5 | $Na_2S$ | 30.0 | 7.0 | NMP | 15 | 210 | 18 | 690 |
| 6 | $Na_2S$ | 30.0 | 7.0 | NMP | 15 | 210 | 18 | 920 |
| 7 | $Na_2S$ | 30.0 | 7.0 | NMP | 15 | 210 | 18 | 400 |
| 8 | $Na_2S$ | 20.0 | 5.0 | NMP | 15 | 220 | 10 | 1350 |
| 9 | $Na_2S$ | 20.0 | 5.0 | NMP | 15 | 205 | 28 | 730 |
| 10 | $Na_2S$ | 30.0 | 8.0 | NMP | 15 | 210 | 14 | 790 |
| 11 | $Na_2S$ | 30.0 | 8.0 | NMP | 15 | 210 | 18 | 650 |
| 12 | $Na_2S$ | 30.0 | 8.0 | NMP | 15 | 210 | 18 | 570 |
| 13 | $Na_2S$ | 30.0 | 8.0 | NMP | 15 | 210 | 18 | 490 |
| 14 | $Na_2S$ | 30.0 | 8.0 | NMP | 15 | 205 | 31 | 420 |
| 15 | $Na_2S$ | 20.0 | 5.0 | HMPA[5] | 15 | 220 | 10 | 280 |

Notes:
[1]p-DCB : p-dichlorobenzene,
[2]TCB : 1,3,5-trichlorobenzene,
[3]m-DCB : m-dichlorobenzene,
[4]NMP: N—methylpyrrolidone
[5]HMPA: hexamethylphosphoric triamide
[6]charged amount: carbonate (g. equiv.), or carbonate (g. equiv.) + hygroscopic inorganic salt (g. equiv.)
[7]ph = physical mixing, ch = chemical mixing

COMPARATIVE EXAMPLES 1 THROUGH 6

Comparative Example 1 illustrates the case wherein neither a metal carbonate nor a mixture of a metal carbonate with a hygroscopic inorganic salt was added.

Comparative Examples 2 through 4 illustrate the cases wherein the single salt $Na_2CO_3$ prepared in Example 1 or the powdery chemical mixture of $Na_2CO_3$—$Na_2SO_4$ prepared in Example 6 was used. However, in these cases the amount of $Na_2CO_3$ or the $Na_2CO_3$—$Na_2SO_4$ mixture was too small (Comparative Examples 2 and 3), or the amount of water added as solvated water was too large (Comparative Example 4). The amount of water was too small in Comparative Example 5. Comparative Example 6 illustrates the case wherein there was a high water content in a powdery chemical mixture of a metal carbonate with a hygroscopic inorganic salt. The mixture used was prepared in the following manner. Specific amounts of $Na_2CO_3$ and $Na_2SO_4$ were mixed, and to the mixture water in about 10-fold amount was added. The resulting mixture was heated in an oil-bath rotary evaporator (bath temperature: about 150° C.) to dissolve the salts uniformly, and then water was evaporated off under reduced pressure. The content of the evaporator was taken out to obtain a mixture having a high water content, and the mixture was pulverized with an atomizer and sifted with a 48-mesh (Tyler) screen thereby to obtain fine particles of 0.3 mm or less in particle size (water content: 2.6 moles per gram equivalent of $Na^+$. The resulting powder was used in polymerization.

The polymer obtained in each of the Comparative Examples 1 through 6 had a markedly low melt viscosity compared with those in Examples 1 through 6, and the polymer obtained in Comparative Example 5 was somewhat decomposed. The results of the comparative examples are set forth in Table 2.

What is claimed is:

1. A process for producing an aromatic sulfide polymer which comprises heating, to a temperature of 100° to 250° C. in an aprotic solvent, a mixture consisting essentially of:
    (A) a dihaloaromatic compound;
    (B) a substantially anhydrous fine powder of a sulfide of a metal selected from the group consisting of an alkali metal and an alkaline earth metal;
    (C) a substantially anhydrous fine powder of a carbonate of a metal selected from the group consisting of an alkali metal and an alkaline earth metal, or a mixture of the metal carbonate and a hygroscopic inorganic salt; and
    (D) water dissolved in the aprotic solvent in a quantity of 0.01 to 2 mols per gram equivalent of the metal sulfide.

2. The process according to claim 1, in which the metal of the metal carbonate is Na, K Ca, Mg or Ba.

3. The process according to claim 1, in which the hygroscopic inorganic salt consists of at least one anion selected from $SO_4^{2-}$, $Br^-$, $Cl^-$, $HPO_4^{2-}$, $PO_4^{3-}$, $P_2O_7^{4-}$, $P_3O_{10}^{5-}$ and $BO_2^-$ and at least one cation selected from alkali metal ions and alkaline earth metal ions.

4. The process according to claim 1, in which a chemically prepared mixture of the metal carbonate and the hygroscopic inorganic salt is used.

5. The process according to claim 1, in which the quantitative ratio of the metal sulfide in g. equivalent to the metal carbonate in g. equivalent or the metal carbonate in g. equivalent plus the hygroscopic inorganic salt in g. equivalent is in the range of 1:0.3 to 1:10, and the quantitative ratio of the metal carbonate in g. equivalent to the hygroscopic inorganic salt in g. equivalent is in the range of 1:0 to 1:50.

6. The process according to claim 1, in which the dihaloaromatic compound is used in an amount of 0.8 to 1.0 gram equivalent per gram equivalent of the metal sulfide.

7. The process according to claim 1, in which the amount of the water is 0.01 to 1 mol per gram equivalent of the metal sulfide.

8. The process according to claim 1, in which 0.05 to 5 liters of the aprotic solvent is used per gram equivalent of the metal sulfide.

9. The process according to claim 1, in which a dichlorobenzene is used as the dihaloaromatic compound.

TABLE 2

| Comparative Example No. | Metal carbonate and/or hygroscopic inorganic salt | | | | Haloaromatic compound | |
|---|---|---|---|---|---|---|
| | metal carbonate | hygroscopic inorganic salt | mixing ratio (g. eq./g. eq.) | mixing method | charged amount (g. equiv.) | type | charged amount (g. equiv.) |
| 1 | — | — | — | not added | 0 | p-DCB | 28.0 |
| 2 | $Na_2CO_3$ | — | — | alone | 3 | p-DCB | 28.0 |
| 3 | $Na_2CO_3$ | $Na_2SO_4$ | 1/19 | chemical | 3 | p-DCB | 28.0 |
| 4 | $Na_2CO_3$ | $Na_2SO_4$ | 1/19 | chemical | 30 | p-DCB | 28.0 |
| 5 | $Na_2CO_3$ | $Na_2SO_4$ | 1/19 | chemical | 30 | p-DCB | 28.0 |
| 6*1 | $Na_2CO_3$ | $Na_2SO_4$ | 1/19 | chemical | 30 | p-DCB | 28.0 |

| Comparative Example No. | Metal Sulfide | | Water added (mol) | Solvent | | Polymerization Conditions | | Melt viscosity of the resulting polymer (poise) |
|---|---|---|---|---|---|---|---|---|
| | type | charged amount (g. equiv.) | | type | charged amount (liter) | temperature (°C.) | time (hrs) | |
| 1 | $Na_2S$ | 30.0 | 7 | NMP | 15 | 210 | 18 | 200 |
| 2 | $Na_2S$ | 30.0 | 7 | NMP | 15 | 210 | 18 | 200 |
| 3 | $Na_2S$ | 30.0 | 7 | NMP | 15 | 210 | 18 | 220 |
| 4 | $Na_2S$ | 30.0 | 100 | NMP | 15 | 210 | 18 | 90 |
| 5 | $Na_2S$ | 30.0 | 0.1 | NMP | 15 | 210 | 18 | 70 |
| 6*1 | $Na_2S$ | 30.0 | 7 | NMP | 15 | 210 | 18 | (decomp.) 60 |

Note:
*1 A chemical mixture containing 2.6 mols of water per gram equivalent of $Na^+$ was used.

10. The process according to claim 1, in which the dihaloaromatic compound contains a small amount of a tri or higher haloaromatic compound.

11. The process according to claim 1, in which the substantially anhydrous metal sulfide and the substantially anhydrous carbonate or mixture thereof with the hygroscopic inorganic salt are respectively in the form of fine powder passing through a screen having opening of 2 mm.

* * * * *